(12) United States Patent
Gallagher et al.

(10) Patent No.: US 7,695,621 B2
(45) Date of Patent: Apr. 13, 2010

(54) METHOD OF SUPPORTING DENITRIFICATION

(75) Inventors: Michael T. Gallagher, Highland Park, IL (US); James Banaszak, Arlington Heights, IL (US)

(73) Assignee: Opencel LLC, Glencoe, IL (US)

( * ) Notice: Subject to any disclaimer, the term of this patent is extended or adjusted under 35 U.S.C. 154(b) by 0 days.

(21) Appl. No.: 12/537,564

(22) Filed: Aug. 7, 2009

(65) Prior Publication Data

US 2010/0025326 A1 Feb. 4, 2010

Related U.S. Application Data

(63) Continuation of application No. 12/016,746, filed on Jan. 18, 2008, now Pat. No. 7,572,369.

(60) Provisional application No. 60/890,383, filed on Feb. 16, 2007.

(51) Int. Cl.
*C02F 3/28* (2006.01)
*C02F 1/461* (2006.01)

(52) U.S. Cl. .................. 210/610; 205/742; 210/630; 210/903; 210/919

(58) Field of Classification Search ................. 210/610
See application file for complete search history.

(56) References Cited

U.S. PATENT DOCUMENTS

| | | | |
|---|---|---|---|
| 980,463 A | 1/1911 | Welcome | |
| 3,265,605 A | 8/1966 | Doevenspeck | |
| 3,280,982 A | 10/1966 | Barto | |
| 3,397,140 A | 8/1968 | Dea | |
| 3,670,891 A | 6/1972 | Allen | |
| 3,699,906 A | 10/1972 | Gallo | |
| 3,913,500 A | 10/1975 | Paccione et al. | |
| 3,930,998 A | 1/1976 | Knopp et al. | |
| 3,962,069 A | 6/1976 | Inoue et al. | |
| 4,013,552 A | 3/1977 | Kreuter | |
| 4,043,047 A | 8/1977 | Galliker | |
| 4,101,400 A | 7/1978 | Pepping | |
| 4,193,206 A | 3/1980 | Maffet | |
| 4,306,978 A | 12/1981 | Wurtz | |
| 4,367,132 A | 1/1983 | Bell et al. | |

(Continued)

FOREIGN PATENT DOCUMENTS

DE 4101076 8/1991

(Continued)

OTHER PUBLICATIONS

Bradley et al., Bipolar Electrodeposition on Nanotubes (USA) (date unknown).

(Continued)

*Primary Examiner*—Peter A Hruskoci
(74) *Attorney, Agent, or Firm*—Marshall, Gerstein & Borun LLP

(57) ABSTRACT

A method of supporting denitrification includes receiving biological material at a pulsed electric field station and applying a pulsed electric field to the biological material within a treatment zone in the pulse electric field station to generate treated biological material. The method also includes transporting at least a portion of the treated biological material to an anoxic bioreactor in substitution, at least in part, for an external source of electron donor. A system for supporting denitrification is also provided.

7 Claims, 7 Drawing Sheets

U.S. PATENT DOCUMENTS

| | | | |
|---|---|---|---|
| 4,479,876 A | 10/1984 | Fuchs | |
| 4,561,953 A | 12/1985 | Muralidhara et al. | |
| 4,592,291 A | 6/1986 | Sullivan, III | |
| 4,608,179 A | 8/1986 | Deal | |
| 4,620,493 A | 11/1986 | Carlson | |
| 4,631,133 A | 12/1986 | Axelrod | |
| 4,655,932 A | 4/1987 | Roslonski | |
| 4,671,874 A | 6/1987 | Fremont et al. | |
| 4,747,920 A | 5/1988 | Muralidhara et al. | |
| 4,755,305 A | 7/1988 | Fremont et al. | |
| 4,861,496 A | 8/1989 | Diaz | |
| 4,917,785 A | 4/1990 | Juvan | |
| 4,957,606 A | 9/1990 | Juvan | |
| 4,971,705 A | 11/1990 | Roslonski | |
| 5,026,484 A | 6/1991 | Juvan | |
| 5,034,111 A | 7/1991 | Kondo et al. | |
| 5,037,524 A | 8/1991 | Juvan | |
| 5,037,560 A | 8/1991 | Gayman | |
| 5,048,404 A | 9/1991 | Bushnell et al. | |
| 5,049,248 A | 9/1991 | Muralidhara et al. | |
| 5,091,079 A | 2/1992 | Gayman | |
| 5,143,626 A | 9/1992 | Nugent | |
| 5,190,655 A | 3/1993 | Karlsson | |
| 5,230,809 A | 7/1993 | Roslonski | |
| 5,259,959 A | 11/1993 | Mulder | |
| 5,326,530 A | 7/1994 | Bridges | |
| 5,464,513 A | 11/1995 | Goriachev et al. | |
| 5,507,927 A | 4/1996 | Emery | |
| 5,522,553 A | 6/1996 | LeClair et al. | |
| 5,630,915 A | 5/1997 | Greene et al. | |
| 5,690,978 A | 11/1997 | Yin et al. | |
| 5,695,650 A | 12/1997 | Held | |
| 5,801,489 A | 9/1998 | Chism, Jr. et al. | |
| 5,846,425 A | 12/1998 | Whiteman | |
| 5,893,979 A | 4/1999 | Held | |
| 5,965,093 A | 10/1999 | Adams | |
| 5,976,719 A | 11/1999 | Kim et al. | |
| 6,030,538 A | 2/2000 | Held | |
| 6,090,266 A | 7/2000 | Roychowdhury | |
| 6,395,176 B1 | 5/2002 | Held et al. | |
| 6,402,065 B1 | 6/2002 | Higgins | |
| 6,491,820 B2 | 12/2002 | Held et al. | |
| 6,540,919 B2 | 4/2003 | Held et al. | |
| 6,547,951 B1* | 4/2003 | Maekawa | 205/688 |
| 6,709,594 B2 | 3/2004 | Held et al. | |
| 6,984,305 B2 | 1/2006 | McAlister | |
| 7,001,520 B2 | 2/2006 | Held et al. | |
| 7,033,503 B2 | 4/2006 | Park et al. | |
| 7,572,369 B2* | 8/2009 | Gallagher et al. | 210/192 |

FOREIGN PATENT DOCUMENTS

| | | |
|---|---|---|
| EP | 0501708 | 9/1992 |
| FR | 2327965 | 6/1977 |
| JP | 53-91468 | 8/1978 |
| JP | 60-25597 | 2/1985 |
| JP | 1-210100 | 8/1989 |
| JP | 1-307500 | 12/1989 |
| JP | 10-137778 | 5/1998 |
| JP | 11-179391 | 7/1999 |
| JP | 11-253999 | 9/1999 |
| JP | 2000-185238 | 7/2000 |
| WO | WO 98/58740 | 12/1998 |
| WO | WO 99/24372 | 5/1999 |
| WO | WO 02/04356 | 1/2002 |
| WO | WO 2004/004036 | 1/2004 |
| WO | WO2006/017738 | 2/2006 |

OTHER PUBLICATIONS

Castro et al., *Microbial Inactivation of Foods by Pulsed Electric Fields*, J. Food Proc. Pres. 17:47-73 (1993) (USA).

Chauhan, S., Feasability of Biosludge Dewatering Using Pulsed Electric Fields, Battelle Final Report, 1-24 (1998).

*Consideration of Sludge Dewatering Methods* in the Microbiology of Waste Waters (W.B. Sauders & Co.) pp. 6-8, 17 (1971) (USA).

Controlling Fluid Flow with Porous Metals, Machine Design (Jan. 8, 1987).

Cox et al., Review of Recent Lab-Scale Investigation on Co-Digestion of Organic Wastes, Water Environment Federation—Joint Residuals and Biosolids Management Conference 2005 (Apr. 17, 2005) (USA).

Curtiss, *Bacterial Cell Wall*, Microbiology, W.W. Norton & Co. (1976.).

Dentel et al., *Overview of Electrical Arc Conditioning of Biosolids* in Water Environment Research Foundation: Workshop #116 Recent Advances in Biosolids Research: Conditioning, Dewatering, and Beneficial Use 86-98 (1999) (USA).

Dossenbach et al., *Pulse Current Electrodeposition of Palladium Silver Alloys* in AESF (American Electroplaters and Surface Finishers Society) Third International Pulse Plating Symposium H1-H3 (1986) (USA).

El-Shazly et al., *High-Speed Metal Deposition Using Interrupted Current Techniques* in AESF (American Electroplaters and Surface Finishers Society) Third International Pulse Plating Symposium C1-C18 (1986) (USA).

Gaudy, et al., *The Microbiology of Waste Disposal*, in the Microbiology of Waste Waters, W.B. Saunders & Comp., chapter 36 (1971).

Graham Mfg. Co., *Heliflow Heat Exchanger* (not later than Dec. 1997).

Gupta, R.P., *Pulsed High Electric Field Sterilization* (not later than Dec. 1997).

Gutierrez, *Recent Advances in Pulse Plating Power Supply Technology & Plating Capability*, AESF 5th Pulse Plating Symposium 1-23 (Jun. 2000) (USA).

International Search Report and Written Opinion for counterpart International Application No. PCT/US2008/052891, dated Jun. 30, 2008 (9 pages).

Kady International materials—2 pages (circa 1999) (USA).

Kady International materials—4pages (circa 1999) (USA).

Koelzer, *Back to the Basics: Pulse Math*, Plating & Surface Finishing (Dec. 2000) (USA).

Liu et al., Electricity Generation Using an Air-Cathode Single Chamber Microbial Fuel Cell in the Presence and Absence of a Proton Exchange Membrane, Environmental Sci & Tech, 4040-4046 (Jun. 12, 2004) (USA).

Liu et al., Production of Electricity During Waste Water Treatment Using a Single Chamber Microbial Fuel Cell, Environmental Sci & Tech, 2281-2285 (Feb. 21, 2004) (USA).

Logan, Extracting Hydrogen and Electricity from Renewable Resources, Environmental Sci & Tech, 160A-167A (May 1, 2004) (USA).

*Marlen OPTT Series Pump/Stuffer* product brochure (not later than Dec. 1997).

Mertens et al., *Developments of Nonthermal Processes for Food Preservation*, Food Tech. 46(5):124, 126-133 (May 1992) (USA).

*Method Improves Sludge Digestion*, Waste Treatment Tech. News v.12 i8 (1996) (USA).

Milad et al., *PPR Plating for HDI*, PC Fab, 40, 42, 44, 46 (2000) (USA).

Minnesota Dairy Runs Hydrogen Fuel Cell on Biogas, Biocycle, 58 (Jun. 2005) (USA).

Morrisey et al., Sterilization Methods Used in Microbiology, Sterilization Technology, 1993.

Newmet-Thermet Krebsoge Company, Porous Metal Products products brochure (not later than Dec. 1997).

Oh et al., Biological Hydrogen Production Using a Membrane Bioreactor, Biotechnology & Bioeng'g 119-127 (Jul. 5, 2004) (USA).

Parry et al., Bioenergy Conversion of Cow Manure, Water Environment Federation—Joint Residuals and Biosolids Management Conference 2005 (Apr. 17, 2005) (USA).

Peshkovsky et al., *Dipolar Interactions in Molecules Aligned by Strong AC Electric Fields*, J. Magnetic Resonance, 147:104-109 (2000) (USA).

Puippe, *Influence of Charge and Discharge of Electrical Double Layer in Pulse Plating* in Theory and Practice of Pulse Plating (America Electroplaters and Surface Finishers Society), ch. 4, pp. 41-43 (1986) (USA).

Puippe, *Qualitative Approach to Pulse Plating in Theory and Practice* of Pulse Plating (America Electroplaters and Surface Finishers Society), ch. 1, pp. 1-3 (1986) (USA).

Stafford et al., A Competitive Approach to Bioenergy Management, Water Environment Federation—Joint Residuals and Biosolids Management Conference 2005 (Apr. 17, 2005) (USA).

U.S. Departments of Energy and Agriculture, Biomass as Feedstock for a Bioenergy and Bioproducts Industry: The Technical Feasibility of a Billion-Ton Annual Supply (Apr. 2005) (USA) (misnumbering in original).

U.S. Food and Drug Administration, *Kinetics of Microbial Inactivation for Alternative Food Processing Technologies—Pulsed Electric Fields* (Jun. 2000) (USA).

Wadehra et al, *Reduced Wasting from Activated Sludge Processes Using a Mechanical Cell Lysis Technology* in WEFTEC 1999, (1999) (USA).

Water Environment Federation, Be in the Know . . . Go with the Flow! (Sep. 2001) (USA).

Zhang, Q. H., Barbosa-Cánovas, G. V. and Swanson, B. G., Engineering aspects of pulsed electric field pasteurization, J. Food Eng. 25(2):261-281 (1995) (Great Britain).

Zhang, Q. H., Chang, F.-J. and Barbosa-Cánovas, G. V., Inactivation of microorganisms in a semisolid model food using high voltage pulsed electric fields, Lebensm Wiss Technol. 27(6):538-543 (1994) (believed to be Germany).

Zhang, Q. H., Monsalve-Gonzalez, A., Barbosa-Cánovas, G. V. And Swanson, B. G., Inactivation of *E. coli* and *S. cerevisiae* by pulsed electric fields under controlled temperature conditions, Transactions of the ASAE. 37(2):581-587 (1994) (USA).

Zhang, Q. H., Qin, B.-L., Barbosa-Cánovas, G. V. and Swanson, B. G, Inactivation of *E.coli* for food pasteurization by high-strength pulsed electric fields, J. Food Process Preserv. 19(2):103-118 (1995) (USA).

Zhang, Q. H., Qiu, X. and Sharma, S. K., Recent development in pulsed electric field processing. National Food Processors Association—New Technologies Yearbook. 31-46 (1997) (believed to be USA).

* cited by examiner

SCHEMATIC OF PROKARYOTIC CELL

SCHEMATIC OF EUKARYOTIC CELL

METHOD OF SUPPORTING
DENITRIFICATION

This application is a continuation of prior U.S. application Ser. No. 12/016,746, filed Jan. 18, 2008, now U.S. Pat. No. 7,572,369, which claims the benefit of U.S. Application No. 60/890,383, filed Feb. 16, 2007, both of which are hereby incorporated by reference in their entirety in the present application

BACKGROUND

This patent is directed to a method and system for generating a source of electron donors for use in denitrification, and, in particular, to a method and system using pulsed electric fields to release intracellular materials from biological materials for use in denitrification.

Wastewater flowing into a conventional wastewater treatment plant may have a high level of nitrogen compounds (such as nitrates, nitrites, etc.) relative to that which is desirable in the water exiting the plant. These nitrogen compounds may be the product of commercial activity, for example. Alternatively, the nitrogen compounds may be the product of agricultural activity, including runoff from fields fertilized using ammonium nitrates.

One way to lower the level of nitrogen compounds is to pass the treated water through an anoxic reactor to conduct a process known as denitrification. However, the anoxic reactor will require a supply of electron donors and possibly a source of carbon to permit the necessary reactions to occur. Many conventional wastewater treatment plants use compounds such as methanol, ethanol or glycol as the supply of the electron donor and carbon.

The use of compounds such as methanol or ethanol is not without its disadvantages. For one thing, methanol and ethanol are flammable substances that require great care in usage, transport and storage. Additionally, while the amount of methanol or ethanol used on a daily basis may not be that large (relative to the amount of water that is treated), the amounts used over a longer period of time may be quite substantial. Given the price of these substances, and the volatility of the price, this can be a considerable budgetary concern for wastewater plant operators, on the order of $250,000 per year for a plant treating ten million gallons of wastewater per day.

Consideration has been given to using waste organic and cellular material as an electron donor. However, the kinetics of cell oxidation of waste organic and cellular material is so slow as to prevent waste organic and cellular material from being considered as a viable alternative to conventional electron donors, such as methanol or ethanol.

SUMMARY

According to an aspect of the disclosure, a method of supporting denitrification includes receiving biological material at a pulsed electric field station, applying a pulsed electric field to the biological material within a treatment zone in the pulse electric field station to generate treated biological material, and transporting at least a portion of the treated biological material to an anoxic bioreactor in substitution, at least in part, for an external source of electron donor.

According to another aspect of the disclosure, a wastewater treatment system includes a treatment station including an anoxic bioreactor in which denitrification is performed. The system also includes a pulsed electric field station with an inlet adapted to receive biological material, a treatment chamber through which biological material received via the inlet passes and including at least two spaced electrodes between which is generated a pulsed electric field and which define at least one treatment zone therebetween, and an outlet adapted to pass treated biological material. Additionally, the system includes a transport system coupled to the outlet of the pulsed electric field station and the anoxic bioreactor to provide treated biological material to the anoxic bioreactor in substitution, at least in part, for an external source of electron donor.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
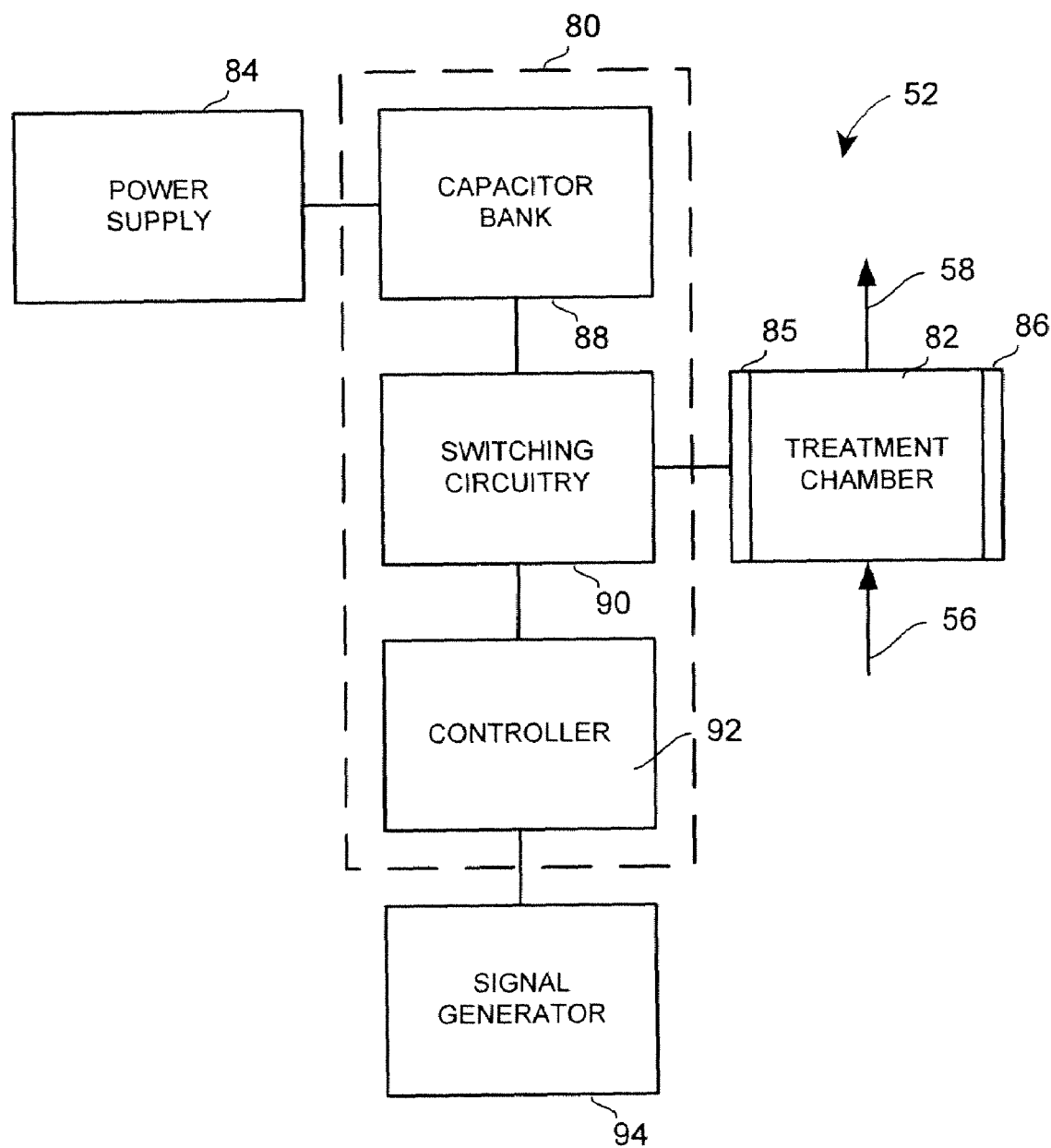
FIG. 1 is a schematic view of an embodiment of a pulsed electric field (PEF) station.

FIG. 1 illustrates an embodiment of a pulsed electric field (PEF) station 52 according to the present disclosure, which PEF station 52 may be used to liberate the electron donor and, potentially, carbon from biological materials for use in a denitrification process, as explained in greater detail below. Biological materials may flow into the PEF station 52 via an inlet 56, may be treated, and may then be released via an outlet 58. The PEF station 52 may include a pulse generator 80 and a treatment, or PEF, chamber 82. In particular, materials contained in or passing through the treatment chamber 82 may be subjected to non-arcing electric field pulses generated by the pulse generator 80.

The electric field pulses may be generated by applying a voltage pulse to the electrodes, the pulse having a square-wave shape. However, the pulses may also have an exponentially decaying or oscillatory shape. Further, the pulses may be monopolar, bipolar, or even instant reverse charges. It is presently believed that the bipolar pulses may enhance the release of the cell contents, as is explained in greater detail below, and may improve energy utilization and electrode performance.

The electric field pulses may be of an individual duration of 2 to 15 microseconds with a peak field strength of 15 to 100 kV/cm. Preferably, the electric field pulses may be of an individual duration of 2 to 8 microseconds with a peak field strength of 20 to 60 kV/cm. The pulses may repeat at frequencies of between 2,000 and 10,000 pulses per second (or pps, and sometimes expressed in Hertz (Hz)). The resulting duration of treatment may be between 20 and 200 microseconds, which may be a function of the shape of the treatment zone (e.g., electrodes) and the characteristics of the electric field pulses. For example, the resulting duration of treatment may be between 20 and 100 microseconds.

Turning first to the pulse generator 80, the generator 80 may be coupled to a power supply 84, which the pulse generator 80 may use to generate a series of high voltage non-arcing electric field pulses across electrodes 85, 86 associated with the treatment chamber 82. Depending on the power supply 84 used, a voltage transformer may be included, coupled between the power supply 84 and the pulse generator 80. The pulse generator 80 may include a bank of capacitors 88 and switching circuitry 90 that may connect the bank of capacitors 88 across the electrodes 85, 86 to create the pulses within the treatment chamber 82. The switching circuitry 90 may be controlled by a controller 92 that has as an input a signal from a signal generator 94. By varying the characteristics of the signal from the signal generator 94, the characteristics of the pulses in the treatment chamber 82 may be varied.

The treatment chamber 82 may be similar or identical to those discussed in any of U.S. Pat. Nos. 5,695,650, 5,893,979, 6,030,538, 6,395,176, 6,491,820, 6,540,919, 6,709,594, each of which are incorporated herein by reference in their entirety.

Figure 2A:
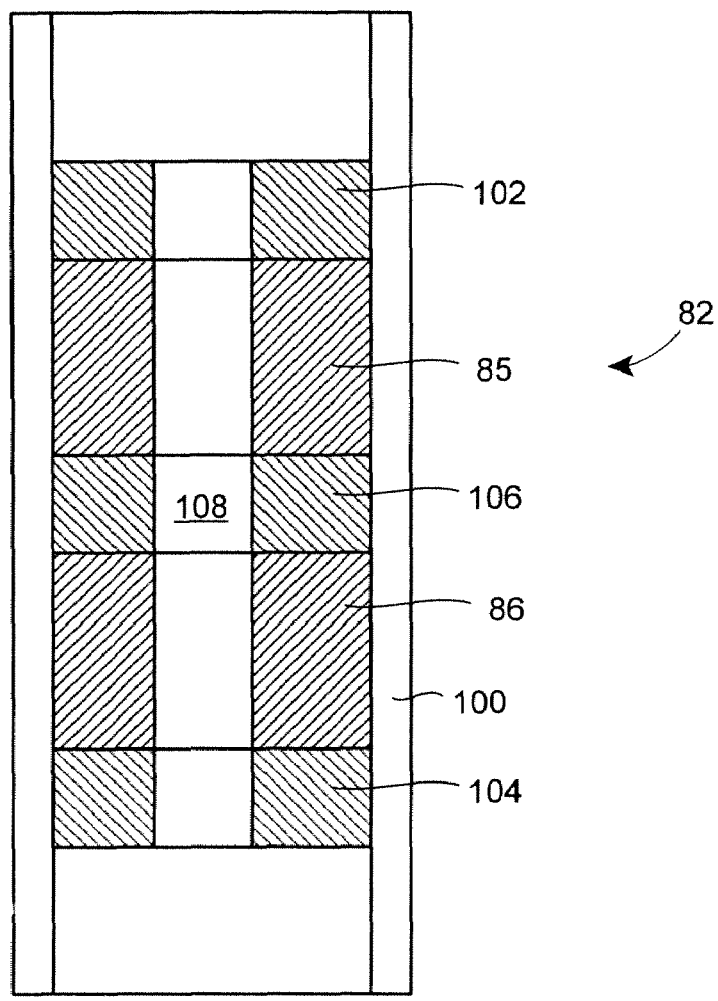
FIG. 2A is a cross-sectional view of an embodiment of a treatment chamber for use in the PEF station of FIG. 1.
Figure 2B:
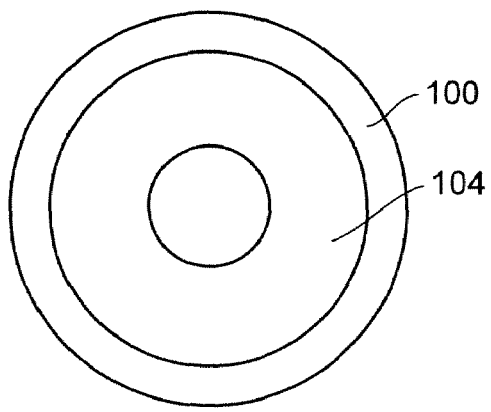
FIG. 2B is an end view of the treatment chamber of FIG. 2A.

Alternatively, an embodiment of the treatment chamber 82 is shown in FIGS. 2A and 2B. The treatment chamber 82 may include a housing 100, which in the present embodiment may be cylindrical in shape, as can be seen in FIG. 2B, although other geometries are possible. In the treatment chamber 82 may be disposed electrodes 85, 86, one of the electrodes 85, 86 coupled to a higher voltage and the other the electrodes 85, 86 coupled to ground or a lower voltage. Insulators 102, 104, 106 may be disposed at either side of the electrodes 85, 86 and between the electrodes 85, 86. The insulators 102, 104, as well as the housing 100, which may be made of an insulating material, isolate the electrodes 85, 86 from couplings which may be attached or secured to either end of the housing 100. Similarly, the insulator 106 and the housing 100 space the electrodes 85, 86 to define a treatment zone 108 disposed therebetween. In operation, the biological materials to be treated are passed through the treatment zone 108 as they pass through the treatment chamber 82.

Figure 3:
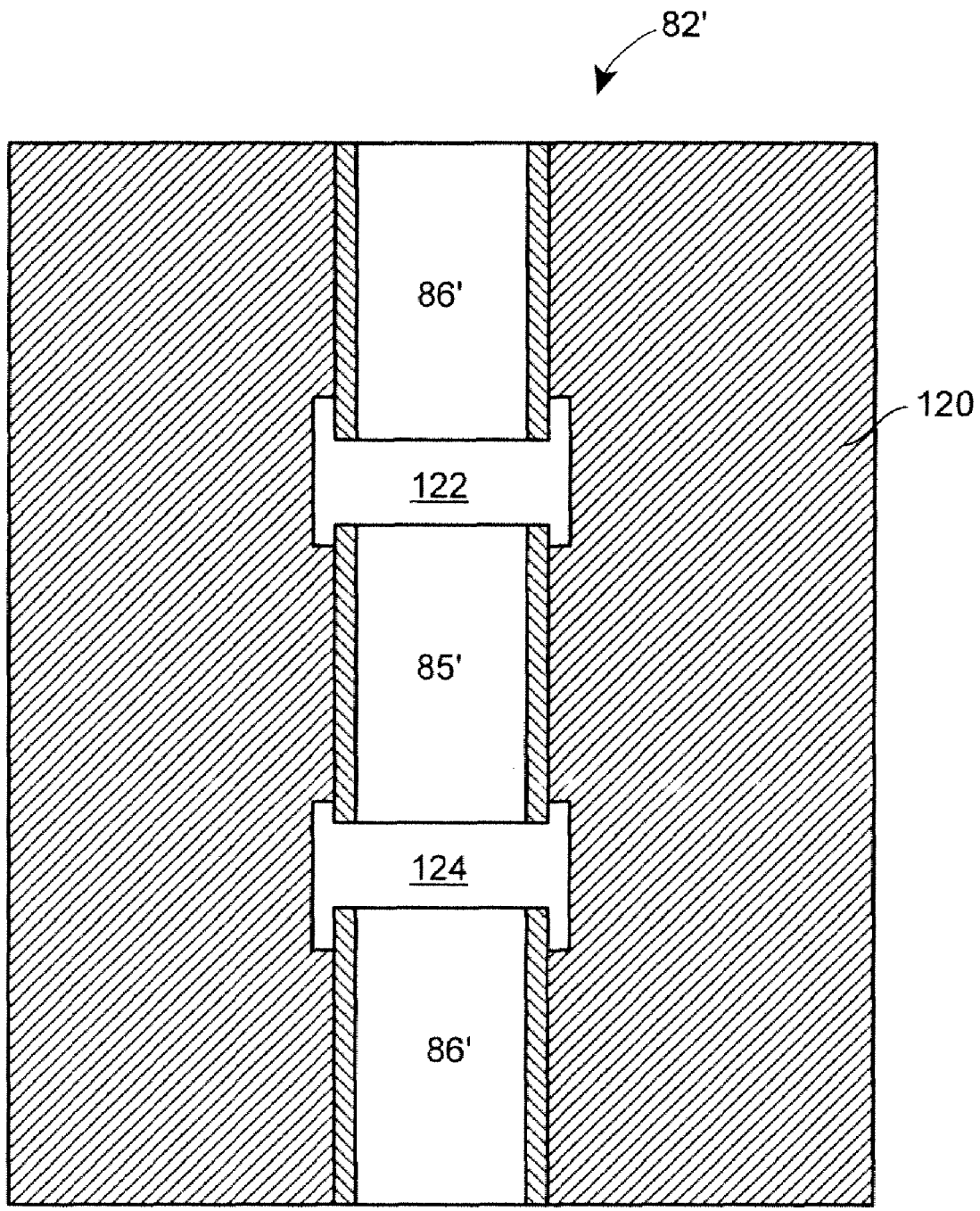
FIG. 3 is a cross-sectional view of another embodiment of a treatment chamber for use in the PEF station of FIG. 1.

As a further alternative, another embodiment of the treatment chamber 82, designated 82', is shown in FIG. 3. The treatment chamber 82' may include a supporting material 120, which may be made of a material having insulating properties. The supporting material 120 may also support three electrodes 85', 86', the electrode 85' being coupled to a higher voltage and the electrodes 86' being coupled to ground or a lower voltage. As shown, the electrodes 85', 86' may be cylindrical in shape, although other geometries are possible. According to this embodiment, two treatment zones 122, 124 are defined between the electrodes 85', 86'. In operation, the biological materials to be treated are passed through the treatment zones 122, 124 as they pass through the treatment chamber 82'.

It will be recognized that access to the substrate in biological materials is a significant threshhold that must be resolved if efficient liberation of the substrate is to be achieved. It is believed that treatment of the biological materials with PEF may enhance the efficiency of the liberation, thereby removing a major obstacle to the commercialization of denitrification using waste materials as a source of electron donor and, potentially, carbon.

Figure 9:
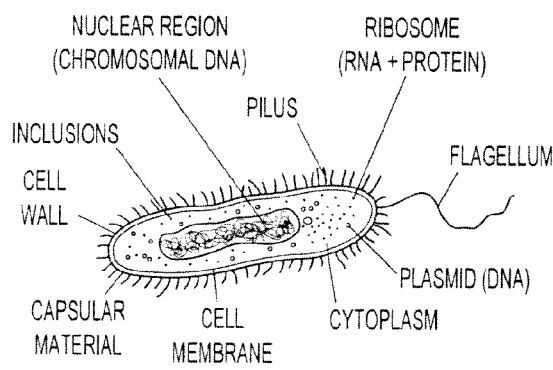
FIG. 9 is a schematic view of a prokaryotic cell.
Figure 10:
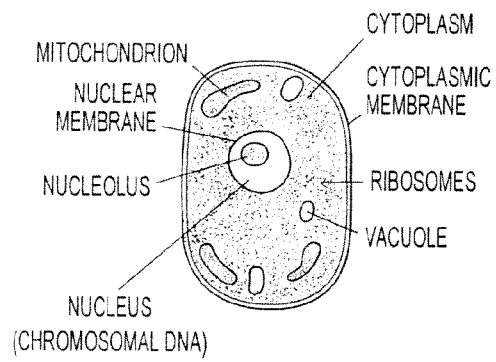
FIG. 10 is a schematic view of an eukaryotic cell.

A significant source of biological material, especially in wastes and wastewaters, is bacteria. Although not all bacteria have the same cell structure (compare the prokaryotic and eukaryotic microorganisms of FIGS. 9 and 10), most bacteria share certain common structural elements. Generally, bacteria may include a colloidal fluid, referred to as cytoplasm. It is in the cytoplasm that the dissolved nutrients, enzymes, other proteins, nucleic acids and other intracellular materials used in the energy generating reactions discussed below may be found. The cytoplasm may include both organic and inorganic biosolids. Further discussion of the composition of the cell, and in particular, the cytoplasm, can be found in Rittmann et al., Environmental Biotechnology (2d ed. 2001), which is hereby incorporated by reference in its entirety. However, bacteria may also include a cell wall and a cell membrane, which lies just beneath the cell wall, that surround the cytoplasm and limit access to the cytoplasm. Consequently, to obtain access to the cytoplasm, one must first deal with the cell wall and membrane.

One way in which access to the cytoplasm may be achieved is by digesting the cell wall and the cell membrane. Unfortunately, digestion is a slow and typically incomplete process. For example, it may take up to 40 days to achieve even incomplete digestion in anaerobic processing of wastewater by methanogenesis.

The use of PEF treatment looks to overcome the cell wall/membrane obstacle. It is believed that when a voltage gradient of one volt or greater is impressed over a microorganisms cell structure, the structure experiences a change referred to as electroporation. More particularly, in electroporation, it is believed that the high voltage electric field pulses temporarily destabilize the lipid bilayer and proteins of the cell membrane. As a consequence of this destablization, it is believed that the cell membrane experiences an increase in permeability. As additional material flows into the cell, because of the increased permeability, it is further believed that the cell swells and the cell wall and membrane eventually rupture. With the cell wall and membrane ruptured, the contents of the cell may be released, which may make the cell contents available as a source of electron donor and, potentially, carbon for the denitrification process.

Testing of PEF treatment on biowaste has been conducted, and the following results have been observed. In regard to the pulsed electric field used, the pulses had a field strength of 17.3 to 20.5 kV/cm, a pulse width of 4 to 6 microseconds, and a frequency of 2000 to 2500 pps. The treatment chamber was similar to that shown in FIGS. 2A and 2B, with the electrodes shaped such that the treatment zone provided a treatment duration of 20 to 100 microseconds. The testing was conducted over a total period of approximately 500 hours. Samples were collected on a daily basis, and analyzed to determine the release of soluble organic and inorganic material from cells relative to the starting materials. A summary of the test results showing the change in soluble material following PEF treatment is shown in Table 1.

TABLE 1

Release of Soluble Cellular Contents

| Parameter Measured | Average Percentage Increase |
|---|---|
| Total dissolved solids | 10.8% |
| Total organic carbon | 72.8% |
| Soluble chemical oxygen demand | 35% |
| Soluble ammonia nitrogen | 29.7% |
| Soluble orthophosphate | 15.4% |
| Soluble total phosphorus | 65% |
| Total kjeldahl nitrogen | 34.3% |

It is submitted that the data in Table 1 indicates that the cell walls and membranes are sufficiently perforated as a consequence of the PEF treatment, leading to the observed increases in the release of the water-soluble cell contents of the treated biowastes. It is further believed the increased amount of soluble organic material is released and available for more efficient use in the denitrification process.

Figure 4:
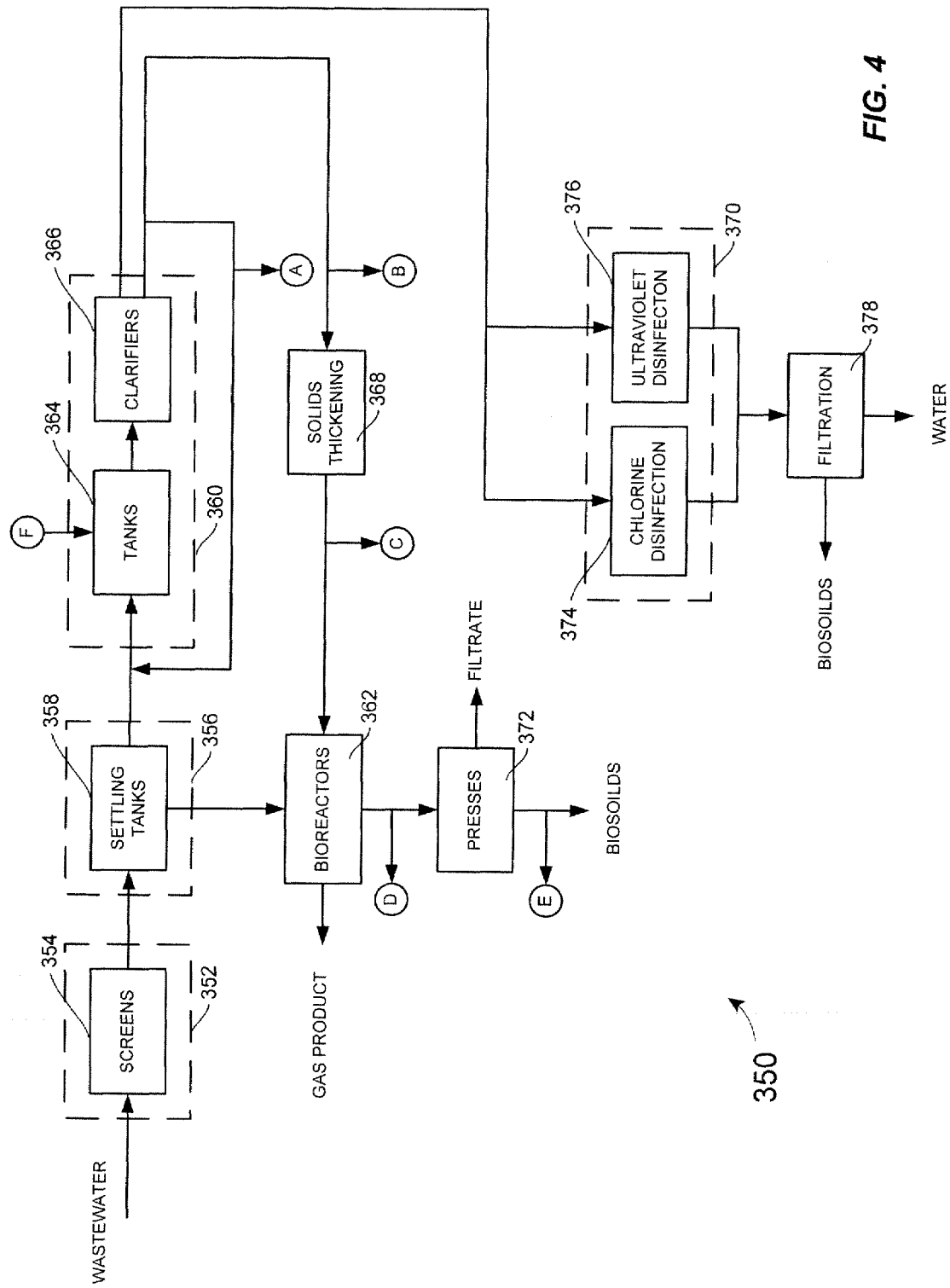
FIG. 4 is a schematic view of a wastewater treatment system in which the PEF station according to FIG. 1 may be used, exemplar positions for integration of the PEF station into the system for generation of electron donor and, potentially, carbon being marked.

According to one embodiment of the present disclosure, the PEF stations 52 may be used to release intercellular contents of materials passing through a wastewater treatment system, such as is shown in FIG. 4, for use in a denitrification process conducted in the same system. The wastewater treatment methods in use today have changed little in their basic principles since they were first developed in the early 1900's. Simply stated, microorganisms are used to consume and to oxidize the organic wastes present in wastewater so that the resultant effluent may be discharged into a large body of water, such as a river, lake or ocean. As a consequence, there are a variety of biological materials (wasterwater, sludges, microorganisms used by the bioreactors, and effluents, for example) present in such a system that may be converted by the PEF station 52 to electron donor and, potentially, carbon for use in the denitrification process.

As shown in FIG. 4, wastewater may enter the wastewater treatment system 350 at the upper left. The wastewater may flow first into a treatment station 352. The treatment station 352 may include one or more screens 354, which may be large metal grates that prevent larger objects in the wastewater stream from passing further downstream. After the wastewater stream passes through the treatment station 352, the wastewater stream may enter the treatment station 356.

The treatment station 356, according to this embodiment of the system 350, may include a plurality of settling tanks 358.

According to other embodiments, the treatment station 356 may include a lagoon. The wastewater may be held in the treatment station 356 to permit larger solids, which were not removed in the treatment station 352, to separate from the remainder of the wastewater. The wastewater may also be held in the treatment station 356 to permit lighter materials, such as oil and grease, to separate from the wastewater and float to the top of the tanks 358. The liquid fraction (which may still contain up to 5% biosolids, and may be referred to as primary effluent) may then be directed to the treatment station 360, while the biosolids that settled to the bottom or floated to the top of the tanks 358 may be directed to one or more bioreactors 362. The materials that are directed to the bioreactors 362 may be referred to as primary treatment biosolids or primary sludge.

Leaving discussion of the bioreactors 362 for the moment, the treatment station 360 may include one or more treatment substations. As shown, the treatment station 360 may include a plurality of tanks 364, which may also be referred to as bioreactors, and a plurality of clarifiers 366. For purposes of denitrification, the tanks 364 may include anoxic (low concentrations of oxygen) tanks in series with aerobic (with oxygen) tanks. The order of the anoxic and aerobic tanks is not believed to be important: that is, the anoxic tanks may be disposed upstream of the aerobic tanks, or the aerobic tanks may be upstream of the anoxic tanks.

According to the embodiment shown, the materials received from the treatment station 356 may be held in the tanks 364 to permit microorganisms within the liquid fraction digest at least some of the biosolids remaining in either a low-oxygen or an oxygen-rich environment. The biosolids and microorganisms may then be separated from the liquid fraction by the clarifiers 366. The fraction of the wastewater leaving the treatment station 360 and containing a higher percentage of biosolids may be referred to as activated sludge. The fraction of the wastewater leaving the treatment station 360 and containing a lower percentage of biosolids may be referred to as secondary effluent.

Some of the waste activated sludge, referred to as return activated sludge, may be returned to the treatment station 360. The remainder of the activated sludge, referred to as waste activated sludge, may be passed along to the thickeners 368, where chemicals, such as polymers, are added to the waste activated sludge or gravity is used to increase the solids concentration. The thickened waste activated sludge may be passed along to the bioreactors 362.

The thickened waste activated sludge and the biosolids from the treatment station 352 may be mixed in the bioreactor(s) 362. In the bioreactors 362, the primary sludge and waste activated sludge may be exposed to microorganisms for anaerobic digestion. At least two product streams may exit the bioreactor 362: a first stream of gaseous by-products and a second stream of solids, digested solids, microbiological processors, and liquid fraction, which is passed along to the presses 372.

In the presses 372, the biosolids exiting the bioreactor(s) 362 may be subjected to pressure to further separate liquids from the biosolids. For example, belt presses and/or centrifuges may be used. The remaining biosolids may be gathered from the presses 372 for disposal, in a landfill, for example, while the liquid fraction may be returned to treatment station 360.

The secondary effluent passes to a final treatment station 370. The final treatment station 370 may include one or more substations, similar to the secondary treatment station 360. For example, the final treatment station may include a chlorine disinfection station 374 and an ultraviolet disinfection station 376. These stations may be concurrent or consecutive.

The resultant flow may then be directed to the filtration station 378.

The filtration station 378 is an optional station, and may be included or omitted depending upon the use for which the resultant treated water is intended. One or more filters, such as sand or crushed coal filters, may be used to remove impurities remaining in the treated water stream. Biosolids collected on the filters may be removed, by backwashing the filters, for example, and directed to the bioreactors 362. The resulting water stream may be discharged into a river, lake or ocean, or put to an alternative use, such as for irrigation or for industrial processes.

As mentioned above, one or more PEF stations 52 may be used in combination with the system 350 to generate electron donor and, potentially, carbon for use in the denitrification process that occurs in the anoxic tanks 364. Denitrification is the process of reducing nitrate and/or nitrite into gaseous nitrogen. When oxygen is present only at low levels, the bacteria in the anoxic bioreactor turn to nitrate (which is a less favorable electron acceptor than oxygen) to respire organic matter. Denitrification may be expressed according to the following redox reaction:

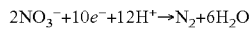

$$2NO_3^- + 10e^- + 12H^+ \rightarrow N_2 + 6H_2O$$

Thus, it is evident that to permit this reaction to occur, there is a need for electron donor.

The PEF station 52 according to the present disclosure may be used at any of a number of different places within the treatment system 350 just described for liberating the electron donor and, potentially, carbon needed by the anoxic tanks 364 for denitrification. For ease of illustration, five junctions within the system 350 have been labeled, A-E. At the present time, it is believed a PEF station 52 may receive part or all of the stream at junctions A-C. It is also believed that a PEF station may receive part of all of the stream at junctions D and E, but it is presently believed that receiving the stream from at the points D and E may not be as well-suited for producing electron donors and, potentially, carbon as the stream received from the points A-C. The product of the PEF station 52 may then be provided to the denitrification process in a continuous stream, or in discrete units, by carrier or shuttle, for example, as represented at point F.

The PEF station disposed at any of the points A-E may be used for processing the biological materials for uses within the system 350 or outside of the system 350 other than for use in the denitrification process occurring in the tanks 364. As such, the treated material from the PEF station 52 may be only a fraction of the overall output of the PEF station 52. For example, in an system that diverts a portion of the treated material from a PEF station 52 that is otherwise processed for other uses, it is believed that 10-20% by volume of the treated material will be diverted to use in the denitrification process.

Figure 5:
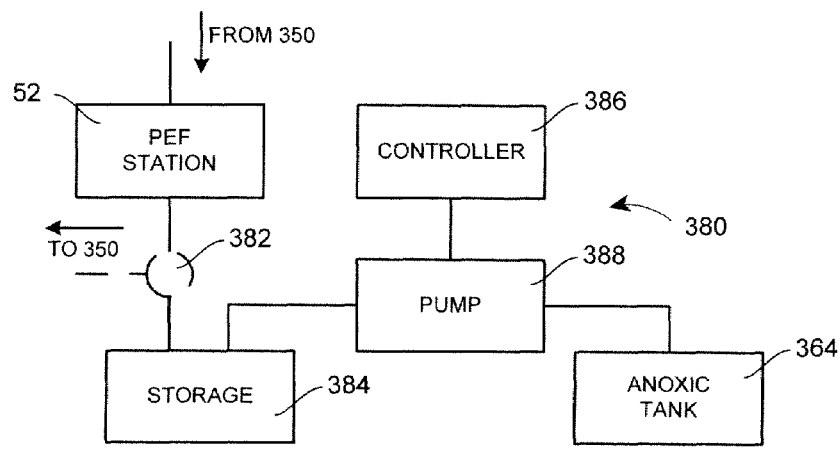
FIG. 5 is a schematic view of a combination of a PEF station, such as shown in FIG. 1, and a transportation system to transport treated material from the PEF station to an anoxic tank.
Figure 6:
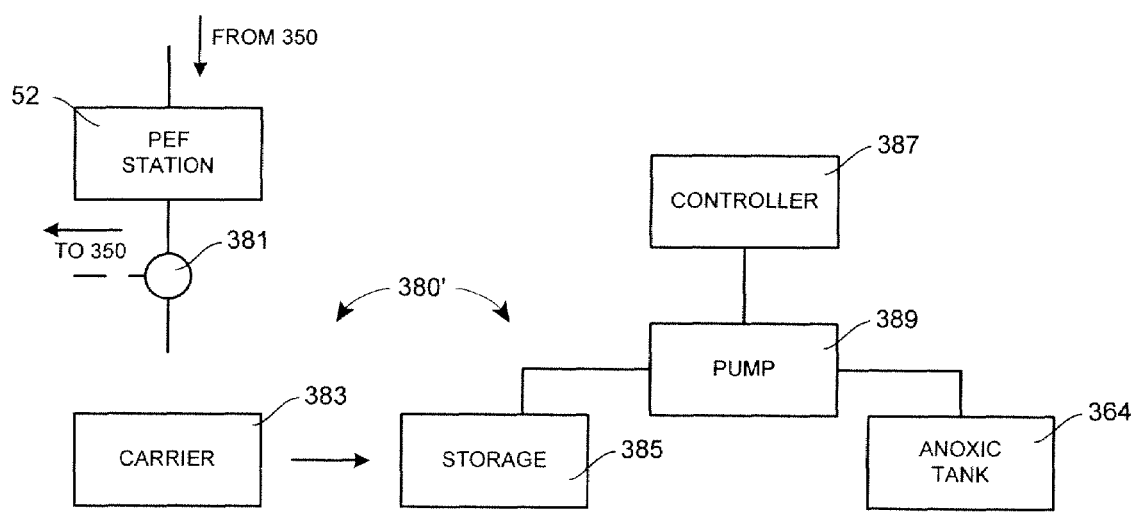
FIG. 6 is a schematic view of a combination of a PEF station, such as shown in FIG. 1, and another transportation system to transport treated material from the PEF station to an anoxic tank.

FIGS. 5 and 6 illustrate possible combinations of PEF station 52 and transportation system 380, 380' that may be used with a wastewater treatment system, such as system 350. It will be recognized that the combinations of FIGS. 5 and 6 are merely exemplary, and not intended to limit the scope of the disclosure thereby. Other embodiments are possible, which embodiments may include carriers moving between a storage facility and the anoxic tank(s) 364 or may provide gravity-assisted transport between the storage facility and the tank(s) 364 so that a pump that may otherwise be included may instead be omitted.

Referring first to the combination illustrated in FIG. 5, the PEF station 52 is illustrated on the left-hand side of the schematic. Untreated material from the system 350, for example, is received at the PEF station 52, and treated material exits the PEF station 52 through an optional three-way valve 382. The three-way valve 382 may permit a portion of the treated material to be selectively diverted from the system 350 to the transportation system 380 for selective transportation. It will be recognized that, according to other embodiments wherein the PEF station 52 does not otherwise supply treated material to the system 350 or for other uses, the three-way valve 382 may be omitted. A pressure-control valve (not shown) may be combined with the three-way valve 382 to control back pressure during treatment and diversion. Further, pressure monitoring equipment may be installed, as may a controller or control logic to operate the three-way valve 382.

The diverted, treated material passes through the three-way valve 382 into a storage facility 384 (which may be a well, a tank or other structure) where it is maintained until it is determined that the treated material should be metered into the tank 364 for use in the denitrification process. When and how much treated material should be metered into the tank 364 may be determined by a controller 386 that has one or more sensors for use in monitoring the conditions within the tank 364. The controller 386 is also coupled to a pump 388, which has its inlet coupled to the storage facility (or storage) 384 and its outlet coupled to the anoxic tank 364. After this fashion, a stream of material may pass from the PEF station 52 to the tank 364 on a more or less continuous basis, according to the demands of the tank 364.

FIG. 6 illustrates a combination of the PEF station 52 with an alternative transportation system 380'. Similar to the combination illustrated in FIG. 5, the combination of FIG. 6 may include a three-way valve 381 (and associated equipment) for diverting treated material in an embodiment where the station 52 ordinarily supplies treated material to the system 350 or for other uses. Where the station 52 does not nor ordinarily supply material to the system 350 or for other uses, another type of valve may be substituted for the three-way valve 381.

The transportation system 380' also includes a storage facility 385, a controller 387, and a pump 389 that is coupled at its inlet to the storage facility 385 and its outlet to the tank 364, with the controller 387 controlling the operation of the pump 389 according to the conditions within the tank 364. However, rather than having a direct connection, via pipe or conduit, from the valve 381 to the storage facility 385, the treated material exits the valve 381 and is received within a shuttle or carrier 383. The shuttle or carrier 383 may include a receptacle or bucket that can be moved manually or with automated-assistance between the valve 381 and the storage facility 385. After this fashion, the transport between the PEF station 52 and the storage 385 may in discrete units, and not continuous.

Figure 7:
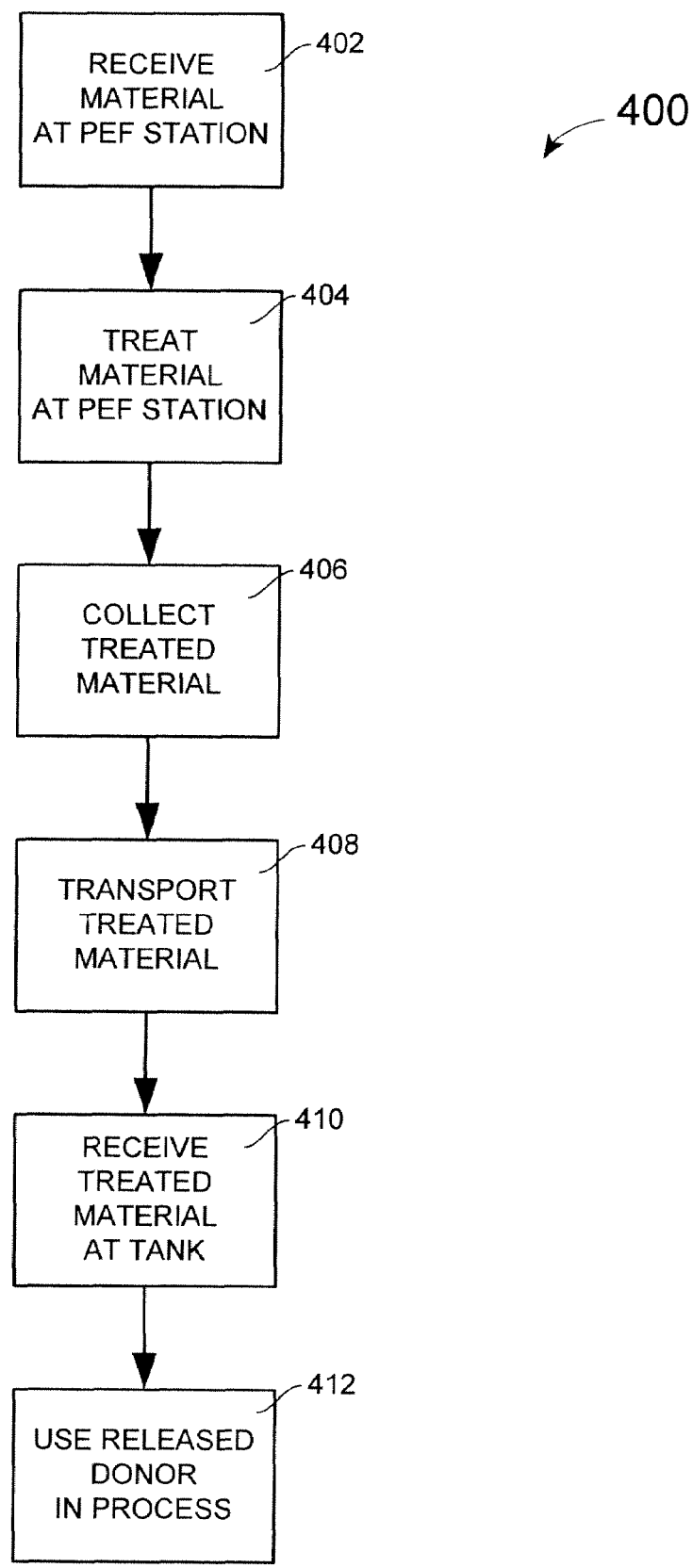
FIG. 7 is a flowchart of an embodiment of a method for generating electron donor and, potentially, carbon according to the present disclosure.

FIG. 7 illustrates a method 400 of generating electron donor and, potentially, carbon for use in a denitrification process, and its subsequent use in a denitrification process.

According to the method 400, a supply of material from the system 350 may be received at the PEF station 52 at block 402. The material may come, as noted above, from any of the junctions A-E, for example. If the material is received from point A, the material may be referred to as return activated sludge, if received from point B, the material may be referred to as waste activated sludge, and if received from point C as thickened waste activated sludge. It will be recognized that because some of the treated material received from points A-E may pass through the points A-E subsequent to its use in the denitrification process, these terms are applied to the majority of the material passing through these points. The material may be received as a continuous or semi-continuous stream, or the material may be received at the PEF station 52 in the form of discrete units, which units may then be run continuously or in discrete units through the PEF station 52.

At block 404, the material is treated in the PEF station 52 to release the intercellular matter from the material. It will be recognized from the discussion above that the release occurs with the material disposed in the chamber 82. It is presently preferred to use waste activated sludge thickened to 5% solids content by volume. Electric field pulses may be generated in the chamber by applying a voltage pulse to electrodes 85, 86. As noted above, the pulse may have a square-wave shape. However, the pulses may also have an exponentially decaying or oscillatory shape. Further, the pulses may be monopolar, bipolar, or even instant reverse charges. It is believed that these electric field pulses cause electroporation and eventually rupture, releasing the intercellular contents of the material.

According to the method 400, the treated material is collected from the PEF station 52 at a block 406, and transported to the anoxic bioreactors in which the denitrification process is occurring at block 408. For example, the treated material, which is now believed to be richer in electron donor and, potentially, carbon as a consequence of the treatment at block 404, may be ejected from the chamber 82 of the PEF station 52 into a transportation system 380, 380', which transportation system 380, 380' is coupled to the tanks 364. It will be recognized from the embodiments of a transportation system 380, 380' illustrated in FIGS. 5 and 6 that, while the treated material may be transported from the station 52 to the tanks 364 directly, the treated material may be transported to a storage area to await future use in the tanks 364.

It will also be recognized from the embodiments of FIGS. 5 and 6 that the method 400 is not limited to only those embodiments wherein the collection occurs in well-defined separation from the transport. In fact, the collection occurring at block 406 and the transport occurring at block 408 may be combined into a single action. For example, a line may connect the outlet of the PEF station 52 to the anoxic tanks 364, as illustrated in FIG. 5, instead of the use of a shuttle or carrier 383, as illustrated in FIG. 6. The line may be used to continuously or semi-continuously inject the treated material into the anoxic tanks to serve as a source of electron donor and, potentially, carbon. It will be recognized that, according to such an embodiment, the collection and transportation occur in very close relation to each other, such that one may even discuss the action as transportation only. However, it will be recognized that even in such an embodiment, collection is occurring at the inlet to the line (outlet 58 of the chamber 82), and transport is occurring between the ends of the line.

Lastly, according to the method 400, the treated material is received at the anoxic bioreactor at block 410 as the electron donor and, potentially, carbon for the denitrification process. The electron donor is then subsequently used in the denitrification process at block 412.

It will be recognized that use of internal material streams within the system 350 as the source of electron donor may reduce or eliminate the use of external sources of electron donors. One direct benefit of limiting or eliminating the use of these external sources may be limitation or elimination of the risks involved with the use of such sources, both physical and financial. One indirect benefit of the diversion of these internal processes material streams for use in supporting the denitrification process may be a reduction in the overall volume of material produced by the system 350 which must then be transported away for eventual disposal, in a landfill for example.

It will also be recognized that alternatives to the above-mentioned embodiment are also possible.

For example, the preceeding embodiment involved the use of one or more PEF stations 52 in combination with a wastewater treatment system, such as the system 350, to generate electron donors for the denitrification process from the biological materials passing through the system. According to other embodiments, the PEF stations 52 may instead receive the material to be treated from a source other than the wastewater treatment system. For example, the material may be municipal, industrial commercial, agricultural or residential waste products, or even materials that are grown or manufactured to be treated at the PEF station(s) 52 to generate electron donor for the denitrification process. According to such embodiments, the method of FIG. 7 would remain essentially the same, except as to block 402. Instead of receiving the materials at block 402 from the system 350, the materials would be received from one of these alternative sources.

As another example, the preceeding embodiment suggested that the treated material used for denitrification may be diverted from an internal stream of material that has been treated at a PEF station, which internal stream of treated material may be further processed within the system 350. However, it is also possible that an internal stream may be diverted for use in a PEF station 52, the output of which may then be used exclusively in the denitrification process. That this, the valves discussed above may be installed at one or more of the junctions mentioned above to divert a fraction of the internal stream to a PEF station 52. This diverted stream may be thickened to approximately 5% solids content by volume according to certain embodiments. The thickened material may be stored prior to treatment, and the treated material may be stored after treatment, or may be transported directly to the tanks 364.

Furthermore, while the combinations illustrated in FIGS. 5 and 6 show treated material being transported from the storage 383, 384 to the tanks 364, this need not be the case according to all embodiments of the present disclosure. For example, a mixing tank or chamber may be disposed upstream of the tanks 364. In this mixing tank or chamber, the treated material from the storage 383, 384 may be mixed with the biological materials entering the tanks 364, which materials may be high in nitrate. As a consequence, it is believed that the processing of the materials entering the tanks 364 may be enhanced.

It should also be noted that, regardless of the embodiment of system and method, the treated material need not provide a complete substitute for the conventional electron donor material typically used in a system 350. It will be recognized that one or more of the benefits described above may be obtained even if the treated material only limits the use of the convention electron donor material, or is used in addition to conventional electron donor material.

Figure 8:
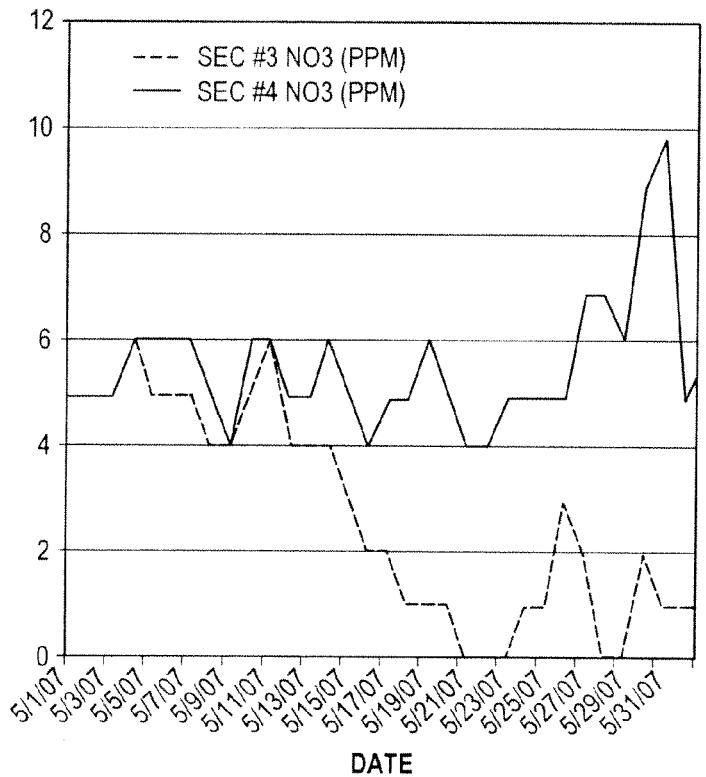
FIG. 8 is a graph showing varying nitrate concentrations in two tanks, one of the tanks having received treated material.

For example, FIG. 8 shows a chart of an example of the nitrate reduction that may occur in an anoxic tank when material treated using a PEF station as described above is used. As illustrated, the top line represents nitrate concentration in an anoxic tank wherein a conventional electron donor, such as methanol, is used. The bottom line represents nitrate concentrations in an anoxic tank wherein the same conventional electron donor is used as in the first tank, but treated material is added to the tank as well. The nitrate concentration is plotted in two-day increments for a month in the chart of FIG. 8. Both anoxic tanks were located in the same wastewater treatment facility.

When comparing the results of the first tank to those of the second tank, it will be recognized that the nitrate concentration of the second tank was equal to or less than that of the first tank, to the degree of precision to which the measurements of nitrate concentration were made. In fact, as additional treated material was added to the second tank over the duration of the experiment, the nitrate concentration was decreased to the point where the nitrate concentration did not register, to the degree of precision used to measure this nitrate concentration.

What is claimed is:

1. A method of supporting denitrification, the method comprising:
   receiving biological material at a pulsed electric field station;
   applying a non-arcing pulsed electric field with pulses that have a pulse width of 2 to 15 microseconds, a peak field strength of 20 to 60 kV/cm and a frequency of 2000 to 10000 pps, to the biological material within a treatment zone in the pulsed electric field station to generate treated biological material; and
   transporting at least a portion of the treated biological material to an anoxic bioreactor in which denitrification is performed on a wastewater having a nitrate concentration with a supply of electron donor and carbon, the at least a portion of the treated biological material used in substitution, at least in part, for an external source of electron donor and carbon, to support said denitrification and decrease the nitrate concentration.

2. The method according to claim 1, comprising:
   transporting substantially all of the treated biological material to an anoxic bioreactor in substitution, at least in part, for an external source of electron donor.

3. The method according to claim 1, comprising:
   transporting at least a portion of the treated biological material to an anoxic bioreactor in substitution for an external source of electron donor.

4. The method according to claim 1, comprising:
   selectively transporting the treated biological material to an anoxic bioreactor in substitution, at least in part, for an external source of electron donor or to at least one of a primary treatment station, a secondary treatment station, a thickening station, or a press.

5. The method according to claim 1, wherein a duration of treatment is a function of the shape of the treatment zone and the pulse width and frequency of the pulsed electric field, and the duration of treatment is between 20-200 microseconds.

6. The method according to claim 1, comprising:
   receiving biological material at the pulsed electric field station, the biological material gathered from a wastewater treatment system.

7. The method according to claim 1, comprising:
   receiving biological material at the pulsed electric field station, the biological material being material gathered from one or more of municipal sources, industrial sources, commercial sources, residential sources, and agricultural sources.

* * * * *